United States Patent [19]

Zweifel et al.

[11] Patent Number: 4,797,674

[45] Date of Patent: Jan. 10, 1989

[54] FLIGHT GUIDANCE SYSTEM FOR AIRCRAFT IN WINDSHEAR

[75] Inventors: Terry L. Zweifel, Phoenix; David A. Johnson, Chandler, both of Ariz.

[73] Assignee: Honeywill Inc., Minneapolis, Minn.

[21] Appl. No.: 834,729

[22] Filed: Feb. 28, 1986

[51] Int. Cl.⁴ .............................................. G08B 23/00
[52] U.S. Cl. ................................. 340/968; 73/178 T; 244/181; 244/182; 340/967; 340/974; 364/434
[58] Field of Search .................... 340/966–968, 340/971, 974; 364/434, 427, 428; 244/181, 182; 73/178 T, 178 R; 342/33

[56] References Cited

U.S. PATENT DOCUMENTS

| | | | |
|---|---|---|---|
| 3,686,626 | 8/1972 | Bateman et al. | 340/974 |
| 3,822,047 | 7/1974 | Schuldt, Jr. | 244/181 |
| 3,839,699 | 10/1974 | Heinsohn | 340/966 |
| 3,840,200 | 10/1974 | Lambregts | 340/968 |
| 4,044,975 | 8/1977 | Blechen et al. | 340/974 |
| 4,079,905 | 3/1978 | Greene | 340/968 |
| 4,189,777 | 2/1980 | Kuntman | 340/968 |
| 4,229,725 | 10/1980 | Reilly | 340/968 |
| 4,319,219 | 3/1982 | Rein-Weston | 340/968 |
| 4,326,253 | 4/1982 | Cooper et al. | 364/428 |
| 4,347,572 | 8/1982 | Berwick, Jr. et al. | 364/427 |
| 4,536,843 | 8/1985 | Lambregts | 364/434 |
| 4,593,285 | 6/1986 | Miller et al. | 340/968 |
| 4,609,987 | 9/1986 | Greene | 364/434 |

OTHER PUBLICATIONS

"Adaptive Autopilot", F. F. Hiltz, Aerospace Electronics Sep. 1960, pp. 130–134, vol. 34 TL501, A83.
"The Missing Element", SAE Technical Paper Series, #830715 Sam Saint, Apr. 1983.
"Wind Shear Development", Aviation Week, Mar. 2, 1981, Kenneth Stein.

Primary Examiner—Joseph A. Orsino
Assistant Examiner—Brent A. Swarthout
Attorney, Agent, or Firm—Arnold L. Albin

[57] ABSTRACT

Method and apparatus for commanding an optimal flight path for an aircraft encountering a windshear condition. An airspeed rate signal equal in magnitude and opposite in sense to the windshear is applied to derive a variable rate of change of airspeed command for application to a flight director indicator. Limits are placed on the derived command such that the minimum allowable speed command is stick shaker speed and the maximum allowable speed command is the nominal speed in the absence of the windshear. The resultant command signal represents a true airspeed rate that yields an optimal flight path for the aircraft to exit the windshear condition.

27 Claims, 5 Drawing Sheets

FLIGHT GUIDANCE SYSTEM FOR AIRCRAFT IN WINDSHEAR

BACKGROUND OF THE INVENTION

1. Field of the Invention

This invention relates generally to aircraft flight control instruments, and to the generation and display of commands to allow the flight crew of an aircraft to exit a windshear encounter in an optimal manner. More particularly, it provides a variable speed command derived from the magnitude and duration of the windshear condition, operative between predetermined maximum and minimum safe speed limits.

2. Description of the Prior Art

The phenomenon of windshear can pose a serious threat to the safety of aircraft and in fact has been directly responsible for several serious aircraft accidents. Windshear, either of itself or as a result of attempts by the human pilot to restore the aircraft to its normal flight path, can cause the aircraft to stall or crash. Windshear can be defined as the time rate of change of wind relative to the aircraft, whose effect on the aircraft is to cause large speed or altitude deviations from normal flight. This definition requires that atmospheric turbulence, maneuvering into and out of steady winds, and penetration of a constant wind boundary layer near the ground all be considered windshears since they represent boundary conditions relative to the aircraft. However, usually the magnitude and duration preclude these shears from posing a threat to the aircraft. While the definition requires a rate of change in wind, a constant vertical wind is also considered to be a shear throughout the industry. While not accurately a shear, the effect on the aircraft is identical to a longitudinal wind changing at an equivalent rate.

In the prior art windshear warning systems the detection and guidance provided during a windshear encounter would cause the aircraft to fly at some fixed speed, usually slightly greater than stall speed. The speed commanded was usually a speed known as stick shaker speed, approximately five percent greater than stall speed, and is the speed where artificial means are used to vibrate the control column or stick to warn the human pilot of impending stall. Stick shaker speed is generally considered to be the minimum speed for safe flight, and varies with the angle of attack of the aircraft and flap position. By reducing his forward speed, the pilot is able to gain altitude rate.

As many commercial transport aircraft, general aviation aircraft, and military aircraft are equipped with a Flight Director System whereby pitch command signals may be displayed to the human pilot, the speed command for a windshear encounter is usually presented as a displacement of the pitch command bar. When the human pilot maneuvers the aircraft in such a manner as to reduce the displacement to null, the speed of the aircraft will be at the commanded speed, since the speed is a function of pitch for constant engine thrust.

A shortcoming of the prior art is that the commanded fixed speed may result in the aircraft flying at the minimum "safe" speed when the magnitude and duration of the windshear do not in fact require such a maneuver. Flying at the minimum safe speed results in a degradation of the speed margin of the aircraft and hence reduces the margin of error allowable to the human pilot in controlling the aircraft. Consequently, prior art systems could in fact create a potentially dangerous situation wherein the speed margin of the aircraft was diminished substantially, even though the magnitude and duration of the windshear did not warrant it.

Conversely, prior art systems which utilize a commanded fixed speed significantly greater than stick shaker speed do not command the aircraft to a diminished speed adequate to cope with the windshear condition for windshears whose magnitude and duration warrant the stick shaker speed command.

Prior art systems, in summary, failed to recognize that the important command parameter is not a fixed air speed command but is in fact a variable air speed command derived from the rate of change of air speed due to the windshear encounter. The present invention determines the correct air speed rate command based on both the magnitude and duration of the windshear condition and hence overcomes the shortcomings of the prior art in that its command causes the aircraft to fly at the speed appropriate to the magnitude and duration of the windshear encountered.

SUMMARY OF THE INVENTION

A detected rate of change of longitudinal windshear component is algebraically summed with a detected vertical windshear component, converted into the equivalent of a longitudinal windshear, to derive a signal representative of the magnitude and duration of the windshear, and applied to an aircraft control parameter to produce a variable flight command proportional to airspeed rate. Limits are placed on the computed command such that the minimum speed commanded is stick shaker speed and the maximum is the nominal allowable speed in the absence of the windshear. The resultant signal represents an air speed rate command that yields an optimal flight path for the aircraft to exit the windshear condition.

In a preferred embodiment of the apparatus aspects, the invention comprises an air data computer for providing a signal proportional to airspeed rate, a windshear detection computer for providing a signal proportional to the vector rate of change of the windshear condition, an angle of attack sensor for providing a signal proportional to an angle of attack, assuming junction responsive to the airspeed rate, windshear rate, and angle of attack signals for deriving a command signal representative of a change in the airspeed rate signal and thereupon applying the command signal to provide an output representative of the magnitude thereof.

DESCRIPTION OF THE PREFERRED EMBODIMENTS

The effect of a constant wind on the aircraft is defined by the well-known equation which relates the wind speed and true air speed of the aircraft to its ground speed:

$$V_{GROUND} = V_{AIR} + V_{WIND} \tag{1}$$

where $V_{GROUND}$ is the ground speed of the aircraft measured in feet per second, $V_{AIR}$ is the true air speed of the aircraft measured in feet per second, and $V_{WIND}$ is the wind velocity in feet per second and by convention is positive for a tailwind. True airspeed is the magnitude of the wind relative to the aircraft. In U.S. Pat. No. 3,930,610 true airspeed is defined at column 4, lines 3–17 as a signal which is developed from an airspeed sensor, processed through a true airspeed computer, and then further corrected for position error, and results when the indicated airspeed (IAS-the actual instrument indication for some given flight condition) is corrected for errors of the instrument and errors due to the position or location of the installation to as great an extent as possible to provide the calibrated airspeed (CAS) and for other relevant variables effecting the accuracy of the aircraft airspeed signal, such as compressibility effects and density.

The first derivative of equation (1) with respect to time produces the rate relationship:

$$\dot{V}_{GROUND} = \dot{V}_{AIR} + \dot{V}_{WIND} \tag{2}$$

where the dot superscript is understood to be the equivalent of d/dt (i.e.; V is equal to dV/dt) and the units of all variables are in feet per second per second.

Solving equation (2) for the wind rate yields:

$$\dot{V}_{WIND} = \dot{V}_{GROUND} - \dot{V}_{AIR} \tag{3}$$

Equation (3) forms the basis for the measurement of the longitudinal wind rate and may be used in the detection of a windshear as in the present assignee's U.S. Pat. No. 4,598,285, filed May 6, 1983 and issued June 3, 1986, Windshear Detection and Warning System With Evasion Command, invented by Harry Miller and Terry L. Zweifel, and Ser. No. 835,446, Vertical Windshear Detection for Aircraft, invented by David A. Johnson and Terry L. Zweifel, and assigned to the assignee of the present invention, which are incorporated herein by reference. The value of ground speed rate may be derived directly from an accelerometer mounted along the longitudinal axes of the aircraft and corrected for pitch and roll, and true air speed rate may be obtained from an air data computer aboard the aircraft.

The performance capability of the aircraft is defined by the equation:

$$\frac{(T-D)V}{W} = \frac{\dot{V}V}{g} + \dot{h} \tag{4}$$

where
T = the thrust of the aircraft in pounds
D = the aerodynamic drag of the aircraft in pounds
W = the weight of the aircraft in pounds
V = the speed of the aircraft in feet per second
$\dot{V}$ = the rate of change of speed in feet per second per second
g = the gravitational constant, 32.17 feet per second per second
$\dot{h}$ = the altitude rate of the aircraft in feet per second.

Figure 1:
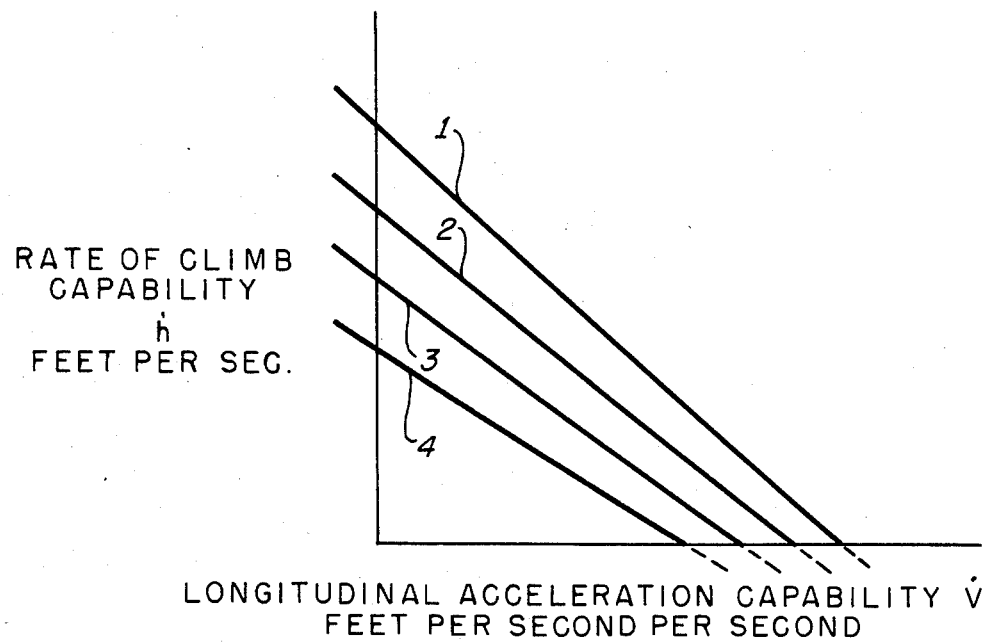
FIG. 1 is a graph illustrative of the rate of climb capabilities of an aircraft in the absence of windshear.

Equation (4) is valid for a coordinate system either relative to the ground or relative to the air mass in which the aircraft is flying. FIG. 1 is a graph illustrative of equation (4) for several speeds with a constant thrust and weight of the aircraft in the absence of a windshear. The ordinate axis represents the aircraft's rate of climb capability and the abscissa its longitudinal acceleration capability. Lines 1 through 4 indicate how the capabilities change with varying air speed. Line 1 is representative of the normal air speed while line 4 shows the aircraft's capabilities at stick shaker speed. Lines 2 and 3 represent speeds between these two. Each line is the locus of flight path angles for a constant air speed since flight path angle is defined by the well-known approximate equation for small flight path angles:

$$\gamma = \dot{h}/V \tag{5}$$

where $\gamma$ is the flight path angle in radians, $\dot{h}$ the rate of climb in feet per second of the aircraft and V its true air speed in feet per second.

In the absence of longitudinal windshear, the aircraft's longitudinal acceleration capability relative to a ground coordinate system is identical with its capability relative to the air mass since the wind rate term in equation (2) is null. That is, the coordinate axes relative to the ground and relative to the air mass are coincident.

Figure 2:
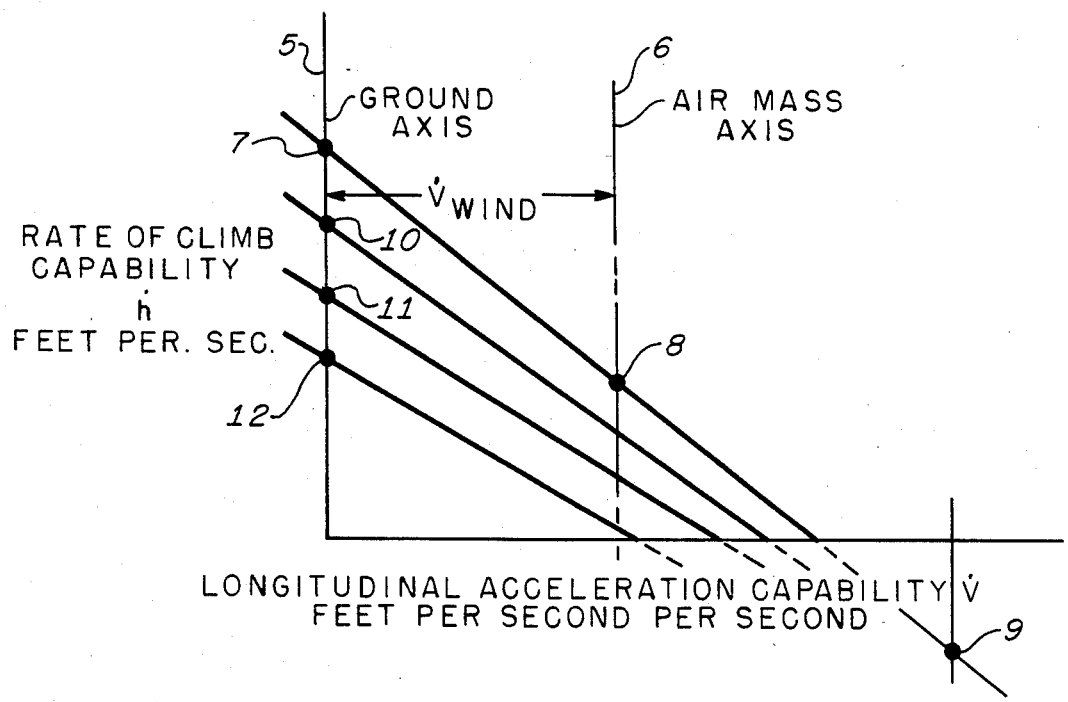
FIG. 2 is a graph showing of the effect of longitudinal windshear on the performance capability of an aircraft and illustrates the axis shift between ground and air mass coordinate systems caused by a tail windshear encounter.

In the presence of a longitudinal windshear, the wind rate term $\dot{V}_{WIND}$ in equation (2) is not null and the effect is to cause an apparent displacement of the ordinate axis between the ground and air mass coordinate systems. This displacement for a tailwind shear is illustrated in FIG. 2. Line 5 is the ordinate axis relative to the ground while line 6 is the ordinate axis relative to the air mass. The magnitude of the displacement between the two is the time rate of change of the wind; that is, the value of the longitudinal component of the windshear. The axis displacement is virtually immediate upon encounter with a longitudinal windshear. If the aircraft were not accelerating initially, it would be at the rate of climb and flight path angle of point 7. Relative to the ground coordinate system, there would be no change in longitudinal acceleration; however, relative to the air mass system, the aircraft would lose speed at the rate of the windshear and therefore begin decelerating toward stall speed. If the human pilot were to attempt to arrest the loss of air speed, which at maximum thrust requires a pitch down maneuver, the aircraft would fly to point 8 and thereby be at a significantly lower rate of climb and flight path angle than before the windshear encounter. In addition, the ground speed of the aircraft would increase at the rate of the windshear while the true air speed would be constant. If the human pilot were to try to restore any air speed loss and regain normal speed, an even further reduction in climb rate would result. The aircraft would fly to point 9 and thence have a negative rate of climb and flight path angle, and at the low altitudes typical of the takeoff and landing approach regimes of flight could crash.

FIG. 2 provides the basis for an optimal strategy upon a longitudinal windshear encounter. For an aircraft initially at point 7, if the air speed rate were to be allowed to decrease in an amount equal in magnitude but opposite in sign to the value of the windshear, as the air speed decreased toward stick shaker speed, the altitude rate of climb and flight path angle would decrease until the aircraft arrived at point 12. However, if the duration and magnitude of the windshear were not such as to require the air speed to decrease to stick shaker speed, the aircraft might only achieve either point 10 or 11 until the windshear was exited and the aircraft would be safely accelerated back to its normal flight air speed.

Figure 3:
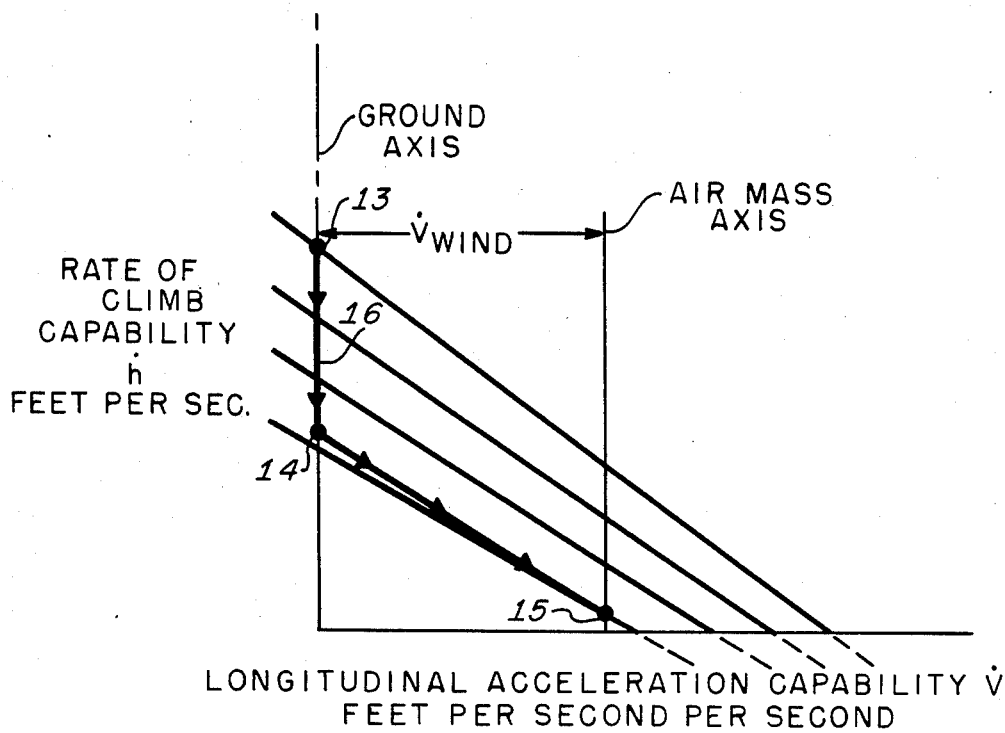
FIG. 3 is a graph illustrative of the optimal flight path trajectory for a windshear encounter.

FIG. 3 illustrates the optimal strategy for a tailwind shear encounter of sufficient duration to require flight at stick shaker speed. Line 16 represents the locus of the optimal strategy. Upon initial windshear encounter, the aircraft is flying at point 13. As the air speed is decreased at a rate equal and opposite to the value of the windshear, the aircraft will traverse along the line segment between points 13 and 14, the latter being above stick shaker speed. At point 14, the aircraft must begin to arrest the air speed rate since it is approaching stick shaker speed, the minimum speed for safe flight. To arrest the air speed rate, the aircraft will travel along the line segment between points 14 and 15. When it has achieved point 15, the aircraft will be at stick shaker speed will null air speed rate. It will be clear that during the described process the rate of climb and flight path angle have been maximized, thus also maximizing the gain in altitude which in turn provides the best chance for exiting the shear by flying through and above it.

A strategy which causes the air speed rate to decrease at a rate larger than the magnitude of the windshear will clearly cause the aircraft to fly at stick shaker speed more often than is required; conversely, a strategy which causes the air speed rate to decrease at a rate less than the magnitude of the windshear does not result in maximizing the gain in altitude that may be required to safety exit the windshear.

The effect of vertical windshear on the aircraft is defined by the equation:

$$\dot{h}_{GROUND} = \dot{h}_{AIR} + \dot{h}_{WIND} \quad (8)$$

where
$\dot{h}_{GROUND}$ = the altitude rate of the aircraft relative to the ground in feet per second
$\dot{h}_{AIR}$ = the altitude rate of the aircraft relative to the air mass in feet per second
$\dot{h}_{WIND}$ = the velocity of the windshear in feet per second, and by convention is positive downward.

Figure 4:
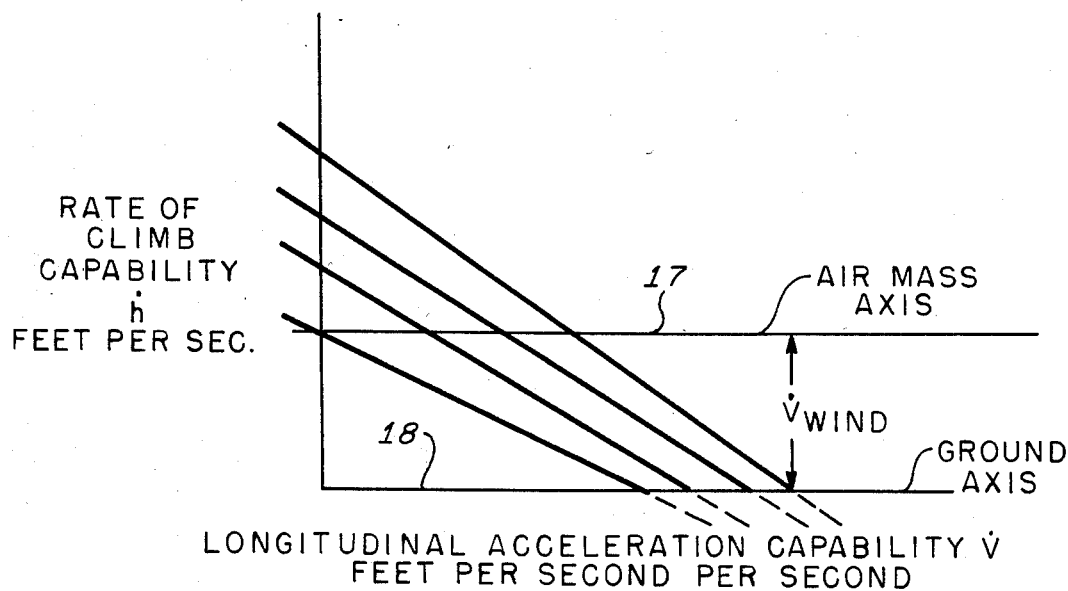
FIG. 4 is a graph illustrative of the effect of vertical windshear on the performance capability of an aircraft and shows the apparent axis shift between ground and air mass coordinate systems caused by the windshear encounter.

The consequences of a downward vertical windshear are shown on FIG. 4. Line 17 represents the abssissa of the air mass coordinate system and Line 18 represents the abscissa of the ground coordinate system. The magnitude and direction of the displacement of the axis between the two systems is equal to the magnitude and sense of the vertical wind rate.

An examination of equation (4) shows that it is a linear equation relating rate of climb and speed rate for a constant aircraft thrust, speed and weight, of the form:

$$\dot{h} = C_1 - C_2 \dot{V} \quad (9)$$

where
$\dot{h}$ = the altitude rate of the aircraft in feet per second
$C_1$ = the term $V(T-D)/W$, in feet per second
$C_2$ = the term $V/g$ in seconds
$\dot{V}$ = time rate of change of speed in feet per second per second.

The constant $C_1$ defines the line intercept with the ordinate axis (point 7 on FIG. 2), and $C_2$ is the slope of the line. Thus, $C_2$ establishes the relationship between changes in h and V. As was shown, the effect of a vertical windshear is to displace the abscissa between the ground and air mass coordinate systems. This displacement is equivalent to a change in the value of h between the two systems. Hence the change in the value of h may be equated to a longitudinal windshear by the relationship:

$$\Delta \dot{h} = C_2 \Delta \dot{V} \quad (10)$$

That is, a vertical windshear has the same effect on the aircraft as a longitudinal windshear of the same sign with a magnitude equal to the change in altitude rate divided by $C_2$. Hence, the optimal strategy for a vertical windshear is identical with that of the equivalent longitudinal windshear defined by equation (10).

As previously discussed, as the air speed of the aircraft decreases toward the stick shaker value, the air speed rate must be controlled to a null value. In order to accomplish this, the stick shaker speed must be known accurately. Stick shaker speed is a direct function of the aircraft's flap position and weight, the latter usually not known with accuracy. However, the angle of attack corresponding to the stick shaker speed for any weight is a constant for a given flap position. That is, the aircraft's angle of attack for stick shaker speed is independent of weight. As the actual angle of attack can be accurately measured, the difference between the acutal and stick shaker angles of attack can be used as an indication of approaching stick shaker speed and thus establish the point when the air speed rate must be arrested.

Figure 8:
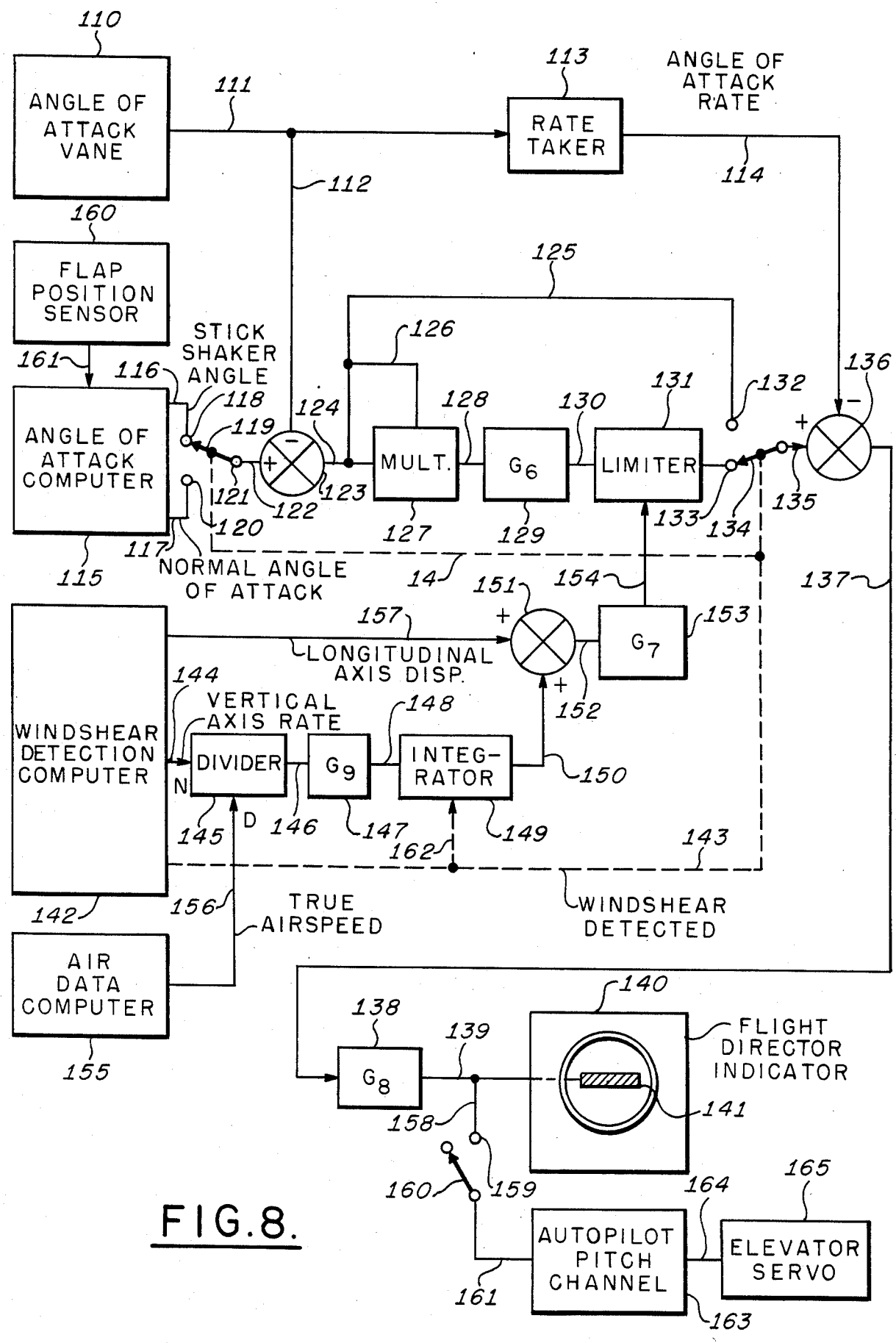
FIG. 8 is a block diagram of a further embodiment of the present invention showing how an optimal angle of attack rate command is generated.

The present invention may be implemented by using conventional analog circuitry and computation techniques or by using conventional wholly digital techniques, or by a combination of conventional hybrid digital-analog techniques. For example, summation devices, limiting functions, and amplifiers may be implemented by operational amplifiers appropriately configured, while logic and mathematical functions may be implemented in a digital computer or the hardware equivalent. Since the functional units represented by the various blocks may be any one of the numerous devices for each respective function well-known in the art, it is considered unnecessary to show circuit detail. For clarity and understanding of the invention, it will be explained by using a generally analog format as shown in FIGS. 5 and 8, it being understood that the same analog format may also represent the programming of a programmable digital computer wherein the various analog inputs are converted to digital signals for digital processing and the various digital outputs are converted to analog signals for providing the flight instrument commands.

Figure 5:
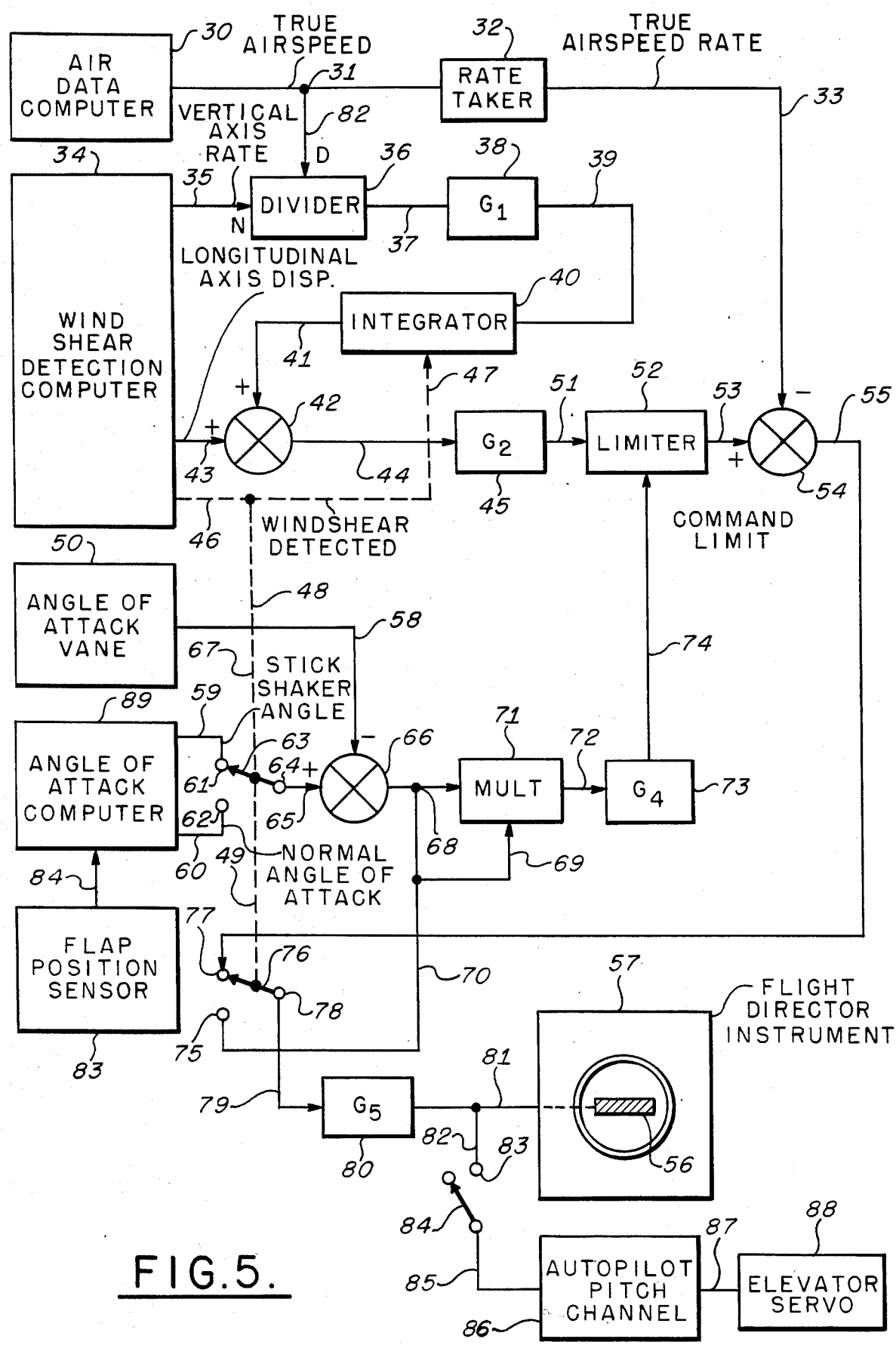
FIG. 5 is a block diagram of a preferred embodiment of the present invention showing the generation of an optimal air speed rate command.

Referring now to FIG. 5, conventional air data computer 30 supplies a signal proportional to true air speed on lead 31 to conventional rate taker 32 whose action is such as to produce the time rate of change of true air speed on lead 33. Simultaneously, in the manner heretofore described, windshear detection computer 34 supplies windshear component signals derived from the vertical axis rate and longitudinal axis displacement on leads 35 and 43, respectively. The signal on lead 35 is supplied to a conventional divider 36 whose output, appearing on lead 37, is the quotient of vertical axis rate and true air speed. Lead 37 supplies gain 38 which multiplies the signal thereon by the gain factor $G_1$ whose value is the gravitational constant (32.17 feet per second per second). The factor g/V represents the inverse of the term $C_2$ in equation (10). The output, which appears on lead 39, converts the rate of vertical axis shift into an equivalent longitudinal axis displacement, and is supplied to conventional integrator 40. Conventional integrator 40 acts in such a manner as to impress the time integral of the signal on lead 39 upon lead 41 whenever a windshear condition has been detected by windshear detection computer 34.

The signal on lead 41 is supplied to a conventional summation device 42 whose function is to supply the algebraic sum of the signals on lead 43 and 41 to lead 44. The signal on lead 44 is supplied to conventional gain 45 which multiplies the value of gain $G_2$, for example 1.0, by the signal on lead 44. The signal on lead 44 represents the combination of the vertical and the longitudinal coordinate axis displacements due to windshear. The output of gain 45 appears on lead 51 and is a signal proportional to the rate of change of air speed required for the aircraft to exit the windshear in an optimal manner. Lead 51 supplies limiter 52, whose action will now be described.

A signal proportional to the true angle of attack of the aircraft appears on lead 58 and is supplied by an angle of attack vane 50. Simultaneously, the aircraft's angle of attack computer 89 receives a signal proportional to the flap position of the aircraft from flap position sensor 83 and lead 84. The angle of attack computer 89 outputs a signal proportional to the stick shaker angle of attack for the measured flap position, which has been prestored in a memory, on lead 59 and switch terminal 61, and a prestored normal angle of attack signal on lead 60 and switch terminal 62. The normal angle of attack is that angle of attack which provides a nominal design speed for a given flap position and flight regime. If a windshear condition has been detected by detection computer 34, switch blade 63 will be in the position shown in FIG. 5; otherwise switch blade 63 will be in contact with terminal 62. Switch blade 63 and terminal 64 supply a signal to a conventional summation device 66 which acts in such a manner as to form the algebraic difference between the signal on lead 58, the actual angle of attack signal, and the selected signal on lead 65. The output of summation device 66 appears at junction 68 and represents the difference between the actual and prestored angle of attack values. One output from junction 68 is supplied to conventional multiplier 71 which uses the same signal via lead 69 to form the square thereof, which signal appears on lead 72 and is coupled to conventional gain 73. Gain 73 multiplies the signal on lead 72 by the value of $G_4$, as for example, 1.0, and supplies the result on lead 74 which in turn supplies the signal to limiter 52.

Figure 6:
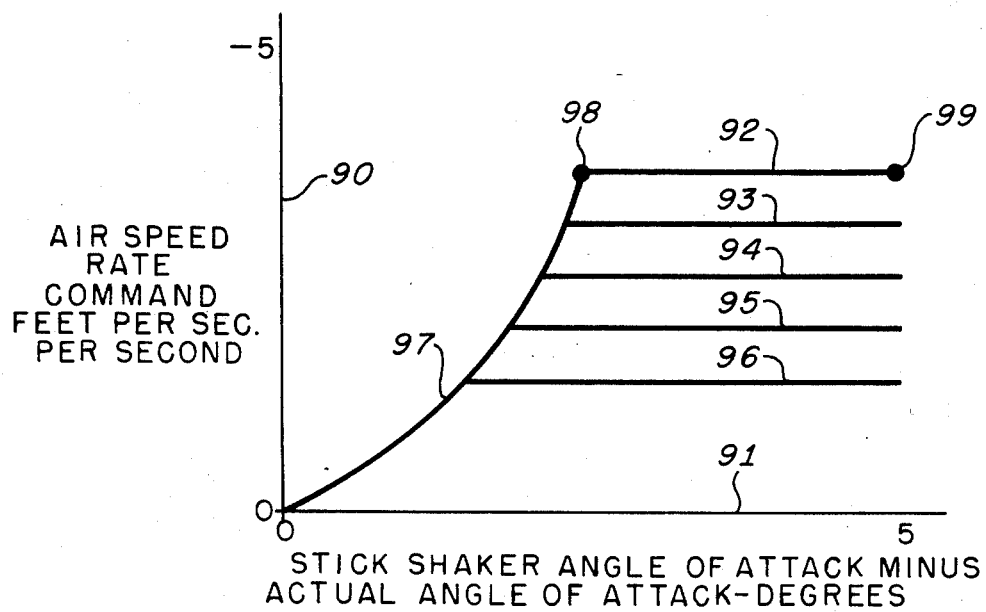
FIG. 6 is a graph illustrative of the limiting of an air speed rate command as a function of the difference between a prestored stick shaker value and the actual angle of attack of the aircraft.

Limiter 52 uses the signal on lead 74 to constrain the value of the signal appearing on lead 51 within a computed value appearing on lead 74. By this action, as the actual angle of attack approaches the prestored value of stick shaker angle fo attack, the output of the limiter 52 which appears on lead 53 and represents the optimal commanded airspeed is continuously diminished until it reaches a null value when the actual and stick shaker angles of attack are identical. The operation of limiter 52 is shown graphically in FIG. 6, where the ordinate axis 90 represents the commanded airspeed rate to produce the optimum response in a windshear encounter. The abscissa 91 represents the difference between the prestored stick shaker angle of attack and the actual angle of attack. Lines 92 through 96 represent specific values of the derived wind rate and wound appear on lead 51 of FIG. 5. Line 97 represents the effect on limiting of the commanded air speed as the difference between stick shaker angle of attack and actual angle of attack diminishes. By way of example, assume the derived wind rate is represented by line 92 and that the initial actual angle of attack is significantly less than the prestored stick shaker value. Then the output of limiter 52 of FIG. 5 would be the exact value represented by point 99. As the actual angle of attack increases, i.e. the air speed of the aircraft diminishes, the difference between the actual and stick shaker angles of attack will also diminish until the point corresponding to point 98 is achieved. As the actual angle of attack increases further, the difference in angles of attack diminishes even more and the output of limiter 52 will decrease along the locus of points of line 97 until, finally when the actual and stick shaker angles of attack are identical, the output will be null, regardless of the current value of lead 51.

Referring again to FIG. 5, the output of limiter 52 appears on lead 53 and is supplied to conventional summation device 54. Summation device 54 operates in such a fashion as to output the algebraic difference of the signals on leads 53 and 33 on lead 55. The signal on lead 55 thus represents the difference between the optimal commanded air speed rate and the true air speed rate of the aircraft. Lead 55 supplies switch terminal 77. In the presence of a detected windshear condition, switchblade 76 will be in the position shown in the figure; otherwise, it will be in contact with terminal 75. Hence, in a windshear condition, the signal on the lead 55 will be supplied to gain 80 through switch terminal 77, switch blade 76, which terminal 78, and lead 79. Gain block 80 multiplies the value of lead 79 by the value of gain $G_5$, which converts the signal to an appropriate value for use by the flight director instrument 57. The output of gain 80 appears on lead 81 and is the command signal to be displayed to the human pilot. Conventional flight director instrument 57 receives the command signal via lead 81 and moves a pitch command bar 56 in a proportional amount via conventional and well-known mechanisms.

The signal on lead 81 may also be coupled via lead 82, contact 83, switch arm 84, and lead 85 to the autopilot pitch channel 86 of an automatic flight control system to energize an elevator servo 88 coupled via lead 87 to produce a predetermined optimum flight path angle during a windshear encounter.

The operation of the selector switch arms 63 and 76 is controlled as follows:

A logical windshear detected signal is supplied by the windshear detection computer 34 and appears on lead 46. This signal is such that a signal representing a logical 1 appears when a windshear is detected and a logical zero appears in the absence of a windshear. The signal is used to change the state of switch blades 63 and 76 in a manner analogous to a conventional electromechanical relay, solid state switching device, or as a digital computer program variable that decides which of two programs shall be executed. If the signal is a logical 1, the switch blades will be in the positions shown on the Figure; if the signal is a logical zero, switch blade 63 will contact switch terminal 62 and switch blade 76 will contact switch terminal 75. In addition, the signal on lead 46 is supplied to integrator 40 via lead 47. A logical 1 on lead 47 will cause the integrator to work in a normal fashion as described previously. A logical zero will cause the integrator to be reset; that is, the output on lead 41 will be null and the integrator will be inactive.

In the absence of windshear, that is if the logical windshear detected signal is a logical zero, the switch blades will be in the positions described in the preceeding paragraph. Therefore, the prestored normal angle of attack signal will be supplied to summation device 66 via lead 60, switch terminal 62, switch blade 63, switch terminal 64, and lead 65. Summation device 66 will thus provide a signal representative of the algebraic difference of actual angle of attack and the prestored normal angle of attack to terminal 68 and then to the flight director instrument 57 via lead 70, switch terminal 75, switch blade 76, switch terminal 78, lead 79, gain 80, and lead 81. Hence, in the absence of windshear, the command signal to the flight director instrument will be such as to cause the aircraft to fly at the prestored normal angle of attack.

Figure 7:
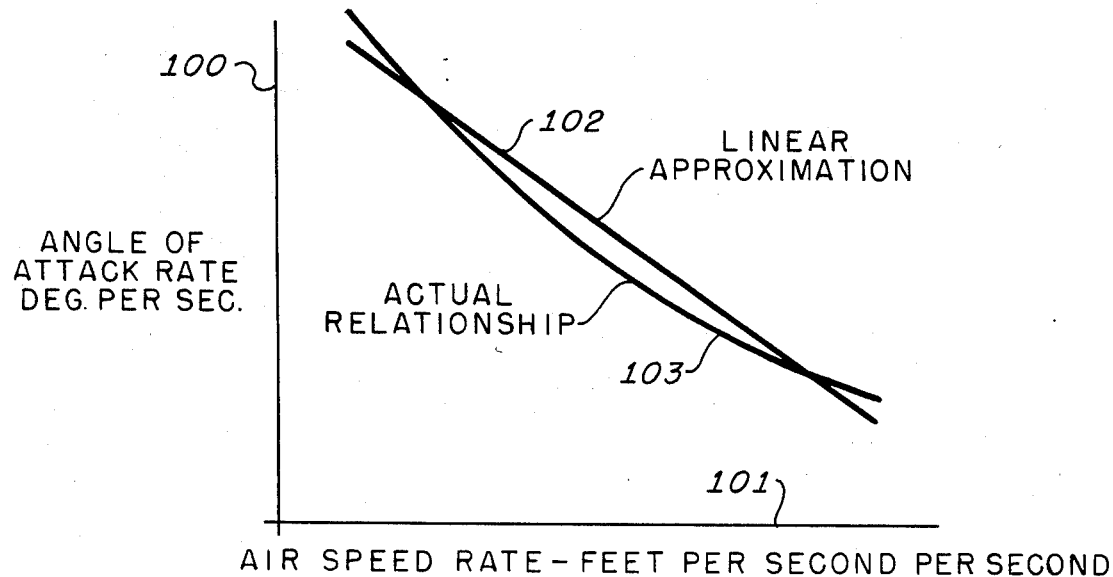
FIG. 7 is a graph illustrating the approximate linear relationship between air speed rate and angle of attack rate.

FIG. 8 shows a further embodiment of the invention in which an angle of attack rate command is provided to the flight director indicator. The flight regimes in which the aircraft is most seriously endangered by a windshear encounter are the take off and landing approach regimes. In these regimes, the true air speeds of the aircraft are typically low in relation to the other regimes of flight. For these lower speeds, the angle of attack of the aircraft is an approximate linear function of its air speed. Consequently, angle of attck rate is also approximately linearly proportional to air speed rate. FIG. 7 illustrates this relationship. The ordinate axis 100 represents angle of attack rate in units of degrees per second. The abscissa 101 represents true air speed rate in feet per second, per second. Line 103 represents a typical actual relationship between the two parameters and line 102 is a linear approximation to the actual relationship. This phenomenon can be utilized in a manner similar to FIG. 5 in computing commands to the flight director instrument.

Referring again to FIG. 8, windshear detection computer 142 supplies a signal on lead 157 proportional to the longitudinal axis displacement created by the windshear condition and simultaneously supplies a signal proportional to the rate of change of the vertical axis displacement on lead 144. Conventional air data computer 155 supplies a signal proportional to the aircraft's true air speed on lead 156 and is coupled to conventional divider 145, the latter also receiving the signal on lead 144.

Divider 145 acts in such a fashion as to produce the quotient of the rate of change of vertical axis displacement and true airspeed signals and is coupled to conventional gain 147. Gain 147, whose magnitude is the value of the gravitational constant g, where g=32.17 feet per second per second, multiplies the signal on lead 146 by its gain value $G_9$ and creates the product on lead 148. Lead 148 supplies conventional integrator 149 which produces an output appearing on lead 150 representative of the time integral of the signal on lead 148 when a windshear condition has been detected. In the absence of a windshear condition, integrator 149 is in a reset condition; that is, its output on lead 150 is null and the integrator is inactive.

Leads 150 and 157 are supplied to conventional summation device 151 whose output on lead 152 represents the algebraic sum of the longitudinal and vertical axis displacements. Lead 152 is supplied to conventional gain $G_7$ in block 153. Block 153 multiplies the signal on lead 512 by the value of gain $G_7$, which is the slope of the linear line 102 of FIG. 7, thus converting the derived air speed rate to angle of attack rate. The output on lead 154 is supplied to limiter 131 whose action has yet to be discussed.

Angle of attack vane 110 supplies a signal proportional to the actual angle of attack of the aircraft on leads 111, lead 112 and to conventional rate taker 113. Conventional rate taker 113 produces an output on lead 114 that is proportional to the true rate of change of the actual angle of attack. Simultaneously, flap position sensor 160 supplies angle of attack computer 115 with a signal proportional to the actual position of the aircraft's flaps via lead 161. Angle of attack computer 115 utilizes this information to output a signal proportional to a prestored stick shaker angle of attack on led 116 and switch terminal 118, and a signal proportional to the normal flight regime angle of attack on lead 117 and switch terminal 120. If a windshear has been detected by windshear detection computer 142, switch blade 119 will be in the position shown on the Figure; otherwise, it will be in contact with switch terminal 120. Switch blade 119 and switch terminal 121 supply conventional summation device 123 via lead 122. Summation device 123 operates in such a fashion as to produce an error signl on lead 124 which is the algebraic difference of the signals on lead 112, actual angle of attack and lead 122, the prestored value of angle of attack. Lead 124 supplies conventional multiplier 127 directly and also with the same signal via lead 126. The output of conventional multiplier 127, which appears on lead 128, is thus the square of the signal appearing on lead 124. Lead 128 supplies conventional gain 129 which multiplies the signal by the value of the gain, for example, 0.8 and outputs the result on lead 130. Lead 130 supplies one input to Limiter 131.

Limiter 131 operates in a similar fashion to limiter 52 of FIG. 5, whose operation has been discussed above. The difference between the two operations is only in the parameter of the ordinate axis of FIG. 6. This raises because the value on led 154 represents the windshear axis shifts converted by gain $G_7$ into an equivalent angle of attack rate. Hence, the action of limiter 131 may be represented by FIG. 6 with the ordinate axis, 90, changed to angle of attack rate.

The output of limiter 131 appears at switch terminal 133. Switch blade 134 will be in contct with terminal 133 if a windshear has been detected; otherwise, switch blade 134 will be in contact with switch terminal 132. Switch blade 134 supplies conventional summation device 136 via lead 135. Conventional summation device 136 acts in such a manner as to produce the algebraic difference of the signal on lead 114, angle of attack rate, and the signal on lead 134, the angle of attack rate command, on lead 137.

Lead 137 supplies conventional gain 138 which multiplies the signal by the value of $G_8$. The value of $G_8$ is such as to convert the magnitude of the signal to an appropriate value for flight director instrument 140.

Conventional flight director instrument 140 receives the signal from the current invention on lead 139 and thereby displaces the Pitch Command Bar 141 by an amount proportional to the value and in a direction corresponding to the sense of the signal on lead 139 for use by the human pilot.

The signal on lead 139 may also be coupled via lead 158, contact 159, switch arm 160, and lead 161 to the autopilot pitch channel 163 of an automatic flight control system to energize an elevator servo 165 coupled via lead 164 to produce a predetermined optimum flight path angle during a windshear encounter.

In operation, a logical windshear detected signal is supplied by the windshear detection computer 152 and appears on lead 143. This signal is such that a signal representing a logical 1 appears when a windshear is detected and a logical zero appears in the absence of a shear. The signal is used to change the state of switch blades 134 and 119 in a manner analogous to a conventional electromechanical relay, solid state switching device, or as a digital computer program variable that decides which of two programs shall be executed. If the signal is a logical 1, the switch blades will be in the positions shown in FIG. 8; if the signal is a logical zero, switch blade 134 will contact switch terminal 132 and switch blade 119 will contact switch terminal 120. In addition, the signal on lead 143 is supplied to integrator 149 via lead 162. A logical 1 on lead 142 will cause the integrator to work in a normal fashion as described previously. A logical zero will cause the integrator to be reset; that is, the output of lead 150 will be null and the integrator will be inactive.

In the absence of windshear, the normal angle of attack for the actual position of the aircraft's flaps will appear at summation device 123 via leads 117, switch terminal 120, switch blade 119, switch terminal 121 and lead 122. Hence, the output an lead 123 will represent the difference between the prestored normal angle of attack and the actual angle of attack. This signal is supplied to summation device 136 via lead 125, switch terminal 132, switch blade 134 and lead 135.

The output of summation device 136 appears on lead 137 and is supplied to flight director instrument 140 via gain 138 and lead 139. Hence the command to the flight director instrument in the absence of windshear is a signal proportional to the difference between the prestored normal angle of attack and the actual angle of attack with angle of attack rate, lead 114, used for providing damping and anticipation in a conventional manner.

While the invention has been described in its preferred embodiments, it is to be understood that the words which have been used are words of description rather than of limitation and that many changes or alterations may be made without departing from the true scope and spirit of the invention in its broader aspects.

We claim:

1. A method for providing a flight command signal for optimizing the flight path of an airborne aircraft encountering a windshear condition, comprising the steps of:
    (a) providing a signal proportional to true air speed rate,
    (b) providing a signal proportional to a vector rate of change of the windshear condition,
    (c) providing a signal proportional to an angle of attack,
    (d) deriving an error signal representative of a desired change in air speed rate by applying said angle of attack signal to limit said vector rate signal whereby as the difference between actual angle of attack and stick shaker angle of attack decreases, the vector rate signal decreases,
    (e) algebraically subtracting said true air speed rate signal from said error signal to derive said command signal.

2. The method as set forth in claim 1 further comprising the step of providing a signal representative of a vertical windshear rate component of said windshear rate signal.

3. The method as set forth in claim 1 further comprising the step of providing a signal representative of a longitudinal windshear rate component of said windshear rate signal.

4. The method as set forth in claim 1, further comprising the step of providing signals representative of both vertical and longitudinal windshear rate components.

5. The method as set forth in claim 4, further comprised of providing a signal representative of the presence or absence of a windshear condition.

6. The method as set forth in claim 5, further comprising:
    (a) limiting said vector rate signal by first and second limits, said first limit comprised of an air speed rate representative of a difference between a predetermined normal angle of attack and an actual angle of attack and said second limit comprised of an air speed rate corresponding to a difference between a predetermined stick shaker angle of attack and an actual angle of attack, said first limit effective for limiting said vector rate signal in the absence of a windshear condition and said second limit effective for limiting said vector rate in the presence of a windshear condition,
    (b) deriving said signals representative of vertical and longitudinal windshear rate components from said windshear condition rate signal,
    (c) deriving said vector rate signal by algebraically summing said longitudinal component and a signal representative of said vertical axis rate component, and
    (d) algebraically subtracting said air speed rate signal from said error signal to derive said common signal.

7. The method as set forth in claim 6, further comprising:
    (a) providing a signal representative of true air speed,
    (b) deriving a quotient of said vertical windshear rate component and said true air speed signal, applying a predetermined gain factor, and integrating the resultant to provide an equivalent longitudinal windshear rate component,
    (c) summing said first mentioned longitudinal rate component and said equivalent longitudinal rate component,
    (d) applying said limited signal to modify said summed signal, thereby to derive said error signal, and
    (e) reducing said air speed rate until said windshear is exited or until said actual and stick shaer angles of attack are equal, whichever condition first occurs.

8. A method for providing a flight command signal for optimizing the flight path of an airborne aircraft encountering a windshear condition, comprising the steps of:

(a) providing a signal representative of an angle of attack rate of the aircraft, (b) providing a signal corresponding to true air speed, (c) providing a windshear rate signal proportional to a vector rate of change of the windshear condition, (d) converting said windshear rate signal to an equivalent angle of attack rate signal by dividing at least a portion of said windshear rate signal by said true air speed signals, integrating the resultant thereof, algebraically summing said portion with a further portion of said windshear rate signal, and multiplying the sum by a predetermined linear factor, (e) providing a signal corresponding to differences of a predetermined stick shaker angle of attack or predetermined normal angle of attack and an actual angle of attack, (f) deriving a signal representative of a desired change in angle of attack rate by limiting said equivalent angle of attack rate signal in accordance with said difference signal, and (g) algebraically subtracting said angle of attack rate signal from said limited equivalent angle of attack signal to derive said command signal.

9. The method as set forth in claim 8, further comprising:

(a) deriving signals representative of vertical and longitudinal windshear rate components from said windshear rate signal, (b) providing a signal corresponding to true air speed (c) deriving a quotient of said true air speed signal and said vertical rate signal, applying a predetermined gain factor, and integrating the resultant to provide an equivalent longitudinal rate component, (d) algebraically summing said equivalent longitudinal rate component and said first mentioned longitudinal rate component, (e) applying said difference signals to limit said signal representative of a desired change in angle of attack rate, one of said difference signals corresponding to said predetermined normal angle of attack signal effective in the absence of a windshear condition and one other than said one of said difference signals corresponding to a predetermined stick shaker angle of attack effective in the presence of a windshear condition, and (f) reducing said angle of attack rate until said windshear condition is exited or until said actual and stick shaker angles of attack are equal, whichever condition first occurs.

10. Apparatus for providing an optimum flight command signal for correcting the pitch attitude of an airborne aircraft in response to a windshear condition encountered thereby, comprising:

(a) means responsive to the position of said aircraft for providing a signal representative of an actual angle of attack, (b) means responsive to the position of an aircraft control surface for providing a signal in accordance with said surface position, (c) means for storing predetermined values of normal angles of attack and stick shaker angles of attack corresponding to said surface position signal and for providing signals representative thereof, (d) means for detecting the presence or absence of a windshear condition and for providing a signal responsive thereto, (e) means responsive to said detection means for selecting said values of normal angles of attack in the absence of a windshear signal and said values of stick shaker angle of attack in the presence of a windshear signal, and (f) means for algebraically combining said actual angle of attack signal and said selected values ot provide a difference signal thereof.

11. The apparatus as set forth in claim 10, further comprising:

(a) means for providing a signal in accordance with true airspeed, (b) means for deriving said signal representative of airspeed rate by differentiatins said true airspeed signal, and (c) means for applying said difference signal to said airspeed rate signal to derive said command signal.

12. The apparatus as set forth in claim 11, further comprising means for applying said command signal to displace the pitch command bar of a flight director instrument proportional to the magnitude of said command signal.

13. The apparatus as set forth in claim 11, further comprising means for applying said command signal to an automatic flight command system coupled to an elevator of said aircraft, thereby to produce movement of said elevator proportional thereof.

14. The apparatus as set forth in claim 11, wherein said windshear rate signal is comprised of a vertical windshear rate component.

15. The apparatus as set forth in claim 11, wherein said windshear rate signal is comprised of a longitudinal windshear rate component.

16. The apparatus as set forth in claim 11, wherein said windshear rate signal is comprised of both vertical and longitudinal rate components.

17. The apparatus as set forth in claim 16, further comprising:

(a) means for providing a signal corresponding to said vertical axis rate component of said windshear rate signal, (b) means for processing said vertical rate component to provide a resultant signal proportional to true air speed, (c) gain means proportional to a predetermined gravitational constant responsive to said processed signal, (d) integrator means responsive to said detection means and coupled to said gain means for providing a resultant signal proportional to the duration of said processed signal, and (e) means responsive to said processed integrated signal for providing a signal corresponding to an equivalent longitudinal axis windshear rate in the presence of a windshear condition.

18. The apparatus as set forth in claim 17, said means for providing an equivalent longitudinal axis windshear rate signal further comprising:

(a) means for receiving said vertical axis rate component signal, (b) means for receiving said true air speed signal and (c) means responsive to said to said air speed signal and said vertical rate signal for providing a quotient thereof, (d) said integrator means further responsive to said detection means and said quotient means for providing an output signal proportional to the magnitude and duration of said vertical windshear rate signal.

19. The apparatus as set forth in claim 17, further comprising:
(a) means for combining said longitudinal axis rate signal and said equivalent longitudinal axis rate signal to provide an algebraic sum thereof,
(b) gain means proportional to a gravitational constant for receiving a signal corresponding to said sum and for providing a signal proportional to a rate of change of air speed, and
(c) means for applying said difference signal to said signal provided by said gain means to provide a limited air speed rate signal responsive to said windshear condition for application to said true air speed signal.

20. Apparatus for providing an optimum flight command signal for correcting the pitch attitude of an airborne aircraft to successfully exit a windshear condition encountered during takeoff or landing, comprising:
(a) means for providing a signal proportional to an actual angle of attack rate of the aircraft,
(b) means for providing a signal proportional to a vector rate of change of said windshear condition,
(c) gain means for linearly converting said windshear rate signal to an equivalent angle of attack rate signal proportional to a predetermined ratio of angle of attack rate to air speed rate,
(d) means for providing a signal corresponding to stick shaker angle of attack,
(e) means for providing a signal corresponding to a normal angle of attack,
(f) means for providing a signal corresponding to an actual angle of attack,
(g) means for algebraically combining said actual angle of attack rate signal, said stick shaker angle of attack signal, said normal angle of attack signal, said actual angle of attack signal, and said equivalent angle of attack rate signal for deriving an error signal representative of a change in angle of attack rate for exiting said windshear condition in accordance with said corrected pitch attitude.
(h) means for algebraically forming a difference of said error signal and said aircraft angle of attack rate signal to derive said command signal,
(i) control means for providing an output indicative of aircraft pitch, and
(j) means for applying said command signal to said control means to provide an output representative of the magnitude thereof.

21. The apparatus as set forth in claim 20, further comprising:
(a) means responsive to the position of the aircraft for providing said signal representative of said actual angle of attack rate,
(b) means responsive to the position of an aircraft control surface for providing a signal in accordance with said surface position,
(c) means for storing predetermined values of normal angles of attack and stick shaker angles of attack corresponding to said surface position signal and for providing signals representative thereof,
(d) means for detecting the presence or absence of a windshear condition and for providing a signal responsive thereof,
(e) means responsive to said detection means for selecting said values of normal angle of attack in the absence of a windshear signal and said values of stick shaker angle of attack in the presence of a windshear signal, and
(f) means for algebraically combining said actual angle of attack signal and said selected values to provide a difference signal thereof.

22. The apparatus as set forth in claim 21, wherein said windshear rate signal is comprised of a vertical windshear rate component.

23. The apparatus as set forth in claim 21, wherein said windshear rate signal is comprised of a longitudinal windshear rate component.

24. The apparatus as set forth in claim 21, wherein said windshear rate signal is comprised of both vertical and longitudinal rate components.

25. The apparatus as set forth in claim 24, further comprising:
(a) means for providing a true air speed signal,
(b) means for providing a vertical axis rate signal,
(c) means responsive to said true air speed signal and said vertical axis rate signal for providing a quotient thereof,
(d) gain means for applying a linear gain factor corresponding to a gravitional constant to said quotient, and
(e) integrator means responsive to said means for detecting the presence or absence of a windshear condition, said quotient means and said gain means for providing an air speed rate signal representative of the magnitude and duration of said vertical axis rate signal.

26. The apparatus as set forth in claim 25, further comprising:
means for combining said integrated vertical axis rate signal and said longitudinal axis rate signal, and means for applying a gain factor corresponding to a predetermined ratio of angle of attack rate to air speed rate, thereby to provide said equivalent angle of attack rate signal.

27. The apparatus as set forth in claim 26, further comprising means responsive to said equivalent angle of attack rate signal and said difference signal for modifying said command signal to provide a further angle of attack rate corresponding to attaining stick shaker angle of attack during a windshear condition, and in attaining a normal angle of attack rate in the absence of a windshear condition.

* * * * *